(12) United States Patent
Chang

(10) Patent No.: US 8,072,984 B2
(45) Date of Patent: Dec. 6, 2011

(54) ETHERNET SWITCHING AND FORWARDING METHOD, SYSTEM AND APPARATUS

(75) Inventor: Yue Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 12/254,299

(22) Filed: Oct. 20, 2008

(65) Prior Publication Data

US 2009/0122801 A1 May 14, 2009

Related U.S. Application Data

(63) Continuation of application No. PCT/CN2007/001874, filed on Jun. 14, 2007.

(30) Foreign Application Priority Data

Jun. 16, 2006 (CN) .............................. 200610061219

(51) Int. Cl.
*H04L 12/28* (2006.01)
(52) U.S. Cl. ................... 370/395.31; 370/389; 370/392; 370/396; 370/401
(58) Field of Classification Search .................. 370/389, 370/395.3, 392, 396, 395.31, 400, 401
See application file for complete search history.

(56) References Cited

U.S. PATENT DOCUMENTS

| | | | |
|---|---|---|---|
| 6,430,621 B1 | 8/2002 | Srikanth et al. | |
| 2002/0080720 A1 | 6/2002 | Pegrum et al. | |
| 2004/0120326 A1 | 6/2004 | Yoon et al. | |
| 2005/0013306 A1 | 1/2005 | Albrecht | |
| 2005/0099969 A1 | 5/2005 | Roberts, III et al. | |
| 2005/0122966 A1 | 6/2005 | Bowes | |
| 2005/0175022 A1 | 8/2005 | Nishimura et al. | |

(Continued)

FOREIGN PATENT DOCUMENTS

CN 1474564 A 2/2004

(Continued)

OTHER PUBLICATIONS

State Intellectual Property Office of the People'S Republic of China, Written Opinion of the International Searching Authority in International Patent Application No. PCT/CN2007/001874 (Oct. 18, 2007).

(Continued)

*Primary Examiner* — Huy Vu
*Assistant Examiner* — Dady Chery
(74) *Attorney, Agent, or Firm* — Leydig, Voit & Mayer, Ltd.

(57) ABSTRACT

An Ethernet switching and forwarding method, and at least one Ethernet forwarding mode of standard Ethernet forwarding, multiplex Ethernet forwarding, layer-3 routing and forwarding, across-VLAN multicast forwarding plane, point-to-point VLAN forwarding, or point-to-point double VLAN forwarding. The method includes: an Ethernet message entering a user side port or a network side port; processing, by the port, the message to provide the message with a VLAN tag allocated uniformly by the port; determining, by the port, a forwarding mode for the message and sending the message to a corresponding forwarding plane; determining, by the forwarding plane, an egress port of the message and processing the specific Ethernet control message in accordance with a control message capturing policy table; and forwarding the message to the egress port and encapsulating the message in accordance with an attribute table of the egress port.

17 Claims, 3 Drawing Sheets

U.S. PATENT DOCUMENTS

| | | |
|---|---|---|
| 2005/0249232 A1 | 11/2005 | Balint |
| 2006/0045075 A1* | 3/2006 | Jiang et al. .................... 370/352 |
| 2006/0126616 A1 | 6/2006 | Bhatia |
| 2006/0190627 A1* | 8/2006 | Wu et al. ...................... 709/249 |
| 2007/0086455 A1* | 4/2007 | Allan et al. ................... 370/389 |
| 2007/0177597 A1* | 8/2007 | Ju ................................. 370/392 |
| 2008/0253385 A1* | 10/2008 | Swain .......................... 370/401 |

FOREIGN PATENT DOCUMENTS

| | | |
|---|---|---|
| CN | 1612562 A | 5/2005 |
| CN | 1728717 A | 2/2006 |
| CN | 100461732 C | 2/2009 |
| EP | 1 039 698 A1 | 9/2000 |
| EP | 1 569 389 A1 | 8/2005 |
| EP | 1594263 A1 | 11/2005 |
| EP | 1 670 187 A1 | 6/2006 |
| JP | 2005/502225 A | 1/2005 |
| WO | WO 02/086674 A2 | 10/2002 |
| WO | WO 2005/109718 A1 | 11/2005 |

OTHER PUBLICATIONS

European Patent Office, Examination Report in European Application No. 07721447.6 (Jan. 21, 2010).

* cited by examiner

ETHERNET SWITCHING AND FORWARDING METHOD, SYSTEM AND APPARATUS

CROSS-REFERENCE TO RELATED APPLICATION

This application is a continuation of International Patent Application No. PCT/CN2007/001874, filed Jun. 14, 2007, which claims priority to Chinese Patent Application No. 200610061219.8, filed Jun. 16, 2006, both of which are hereby incorporated by reference in their entirety.

FIELD OF THE INVENTION

The present invention relates to an application of Ethernet in a telecommunication network and, in particular, to an Ethernet switching and forwarding method, system and apparatus.

BACKGROUND OF THE INVENTION

The transition of a telecommunication operation network toward an IP-oriented network has been predominant along with development and applications of IP technologies, and the Ethernet, which acts as an optimal bearer mechanism for IP, has also been increasingly popular in the telecommunication operation network. Particularly, an access and aggregation network of the telecommunication operation network is typically based on information forwarding over a link layer, and therefore the Ethernet has been a dominant technology for an access and aggregation layer of the telecommunication operation network.

The Ethernet is widely applied in traditional enterprise networks due to its low bandwidth cost, simple management, and easy usage. These advantages are primarily based on the following basic Ethernet technical framework.

1. A Media Access Control (MAC) address: The MAC address is used to identify a terminal and is a forwarding and addressing mode based on flooding and MAC address auto-learning, and can be implemented without specific management and configuration.

2. Virtual Local Area Network (VLAN): The VLAN is a domain identifier for management, used to obtain a finer granularity management domain by reducing a broadcast domain, to implement inter-domain traffic isolation and control.

3. Topology and reliability: A tree-like topology is required to be logically maintained for flooding forwarding, and the tree-like topology is maintained and protected by the Spanning Tree Protocol/Rapid Spanning Tree Protocol (STP/RSTP).

4. Good support for multicast and broadcast.

The above basic technical framework is implemented primarily based on an Ethernet switching chip which is a core device for building an Ethernet apparatus.

FIG. 1 illustrates an Ethernet based Digital Subscriber Line (DSL) access and aggregation network system as defined by the DSL Forum. Likewise, the fiber based Fiber-to-the-X point (FTTx) and the World Interoperability for Microwave Access (WiMAX) have similar access systems except that the Access Node (AN) in FIG. 1 corresponds to an Optical Line Termination (OLT) of the FTTx and a Base Station (BS) of the WiMAX respectively. Their network systems are similar regardless of their different access technologies, and an access device is required to map an access bearer to an Ethernet bearer and traffic aggregation and forwarding is implemented based on Ethernet.

The AN and the Ethernet Aggregation of the access network constitute jointly a telecommunication access and aggregation network. Presently, these devices in the industry comply with the above-mentioned basic Ethernet technical framework and mostly are implemented with the existing Ethernet switching chip.

However, a telecommunication operation network, particularly the access and aggregation networks and telecommunication services, have their own inherent features as follows:

1. The access and aggregation networks are logically of a tree-like topology, instead of an all-switching structure, in a forwarding plane.

2. Logical connections isolated from each other from a user to a Broadband Network Gateway (BBNG) needs to be established.

3. Much attention is paid to management and control, and the management and control of users and data forwarding need to be implemented under the control of a service policy.

4. Much attention is paid to network security to prohibit MAC/IP address spoofing.

5. A Transparent LAN Service (TLS) for Ethernet message forwarding needs to be provided for a dedicated line access.

6. Scalability of the access and aggregation networks (MAC/VLAN) needs to be considered.

7. Efficient multicast from the BBNG to the users needs to be supported.

8. A higher QoS is required.

9. Capabilities of locating and identifying a user and a service needs to be provided.

10. Efficient management and capabilities of detecting and locating a failure needs to be provided for management and maintenance.

These requirements are in conflict with the basic Ethernet technical framework. Therefore, the Ethernet technical framework has to be improved in a telecommunication network context. The existing Ethernet technologies are described as follows.

A first prior art solution: a basic Ethernet forwarding and addressing mode is a solution based on flooding and auto-learning, and the solution includes that an Ethernet switching and forwarding engine creates a MAC address based forwarding table entry through flooding of an unknown/multicast/broadcast MAC address and auto-learning of the MAC address and ensures real time updating of a forwarding table and efficient usage of a forwarding table entry space through a MAC address aging mechanism. The solution with such a mechanism is disadvantageous in that: the MAC address belongs to a user terminal and thus is not trustworthy because numerous network attacks are made through MAC address spoofing, such as a Broadband Remote Access Server (BRAS) address spoofing, message redirecting, which may interfere greatly with a service of a normal user; the learning of the MAC address may consume a MAC address space table, which may result in a scalability problem of an aggregation layer device, for example, currently the aggregation layer device is required to be provided with a MAC address table entry space of at least 32K; and the MAC address table is vulnerable due to a Deny of Service (DoS) attack of the MAC address. Furthermore, the incredibility of the MAC address may also result in disability of identifying or locating a user according to the MAC address.

A second prior art solution: The Ethernet is based on the VLAN, thus obtaining a solution in which a finer granularity management domain is provided by reducing the broadcast domain and inter-domain traffic isolation and control are implemented. Particularly in the solution, since the Ethernet flooding mechanism may cause potential broadcast flooding and service traffic intercommunication between different users, the traditional Ethernet VLAN provides a finer granularity management domain through reducing the broadcast domain using a VLAN identifier and implements inter-domain traffic isolation and control for management and security; and due to the feature of the VLAN traffic isolation, and a field of 802.1p in a VLAN header identifier may be used to identify the priority of a message, the VLAN is typically used as an identifier of a service type in a telecommunication network. However this solution has the following drawbacks: the network security and service isolation cannot be achieved ideally with the existing VLAN technology, because the service intercommunication between users in a VLAN, which is typically prohibited in a telecommunication network, may be implemented with the flooding and MAC address auto-learning mechanism; furthermore, the MAC/IP spoofing still may be present in the VLAN; in addition, the problem of extendibility may occur in the case where the VLAN identifier is used as a service connection identifier between the AN and the BBNG primarily in that a service connection between the AN the BBNG is expected to carry physical location information of a user access port and the AN in addition to identifying a service type but the VLAN is provided with only a space of 4K.

A third prior art solution: a solution to maintaining and protecting a tree-like topology of Ethernet forwarding paths by means of the STP/RSTP is provided. Particularly in the solution, a tree-like topology has to be maintained logically for Ethernet forwarding mode of flooding, and the tree-like topology is maintained and protected by the STP/RSTP in the basic Ethernet technical framework; and a topology of service traffic between the AN and the BBNG in the access and aggregation network primarily includes a topology of point-to-point and point-to-multi-point from the BBNG to the AN, which is actually also a tree-like topology. This solution has the following drawbacks: the convergence of the link topology maintained by the STP/RSTP may be slow, even more in a network having an larger scale; in addition, according to a principle of protection switch, a mechanism at a lower layer has to be provided with more rapid protection switch, to ensure transparency to an upper-layer service; furthermore, the STP/RSTP provides protection according to a physical port or VLAN, but it is commonly required to a telecommunication service to implement end-to-end connection protection for a service connection, thus, the STP/RSTP is not applicable in a large telecommunication network.

A fourth prior art solution: a solution to implementing an Ethernet dedicated line service using Ethernet based on VLAN is provided. Particularly in the solution, a TLS is an important service type in a telecommunication network, and two Ethernet service modes of E-Line (point-to-point) and E-LAN (multi-point-to-multi-point) are further defined in the Metro Ethernet Forum (MEF). An important feature of the Ethernet dedicated line service is to enable user service transport transparency, and according to the traditional Ethernet VLAN technology, the Ethernet dedicated line service is typically identified by a VLAN identifier between the AN and the BBNG and is terminated at the BBNG. The Ethernet dedicated line service is identified and isolated from other services using the VLAN. This solution has the following drawbacks: a problem of transparency occurs in identifying the Ethernet dedicated line service based on a VLAN identifier, because the Ethernet dedicated line service requires all user messages to be transported transparently, but a layer-2 control message of the user, for example, a Bridge Protocol Data Unit (BPDU) message is based on specific multicast MAC encapsulation and cannot be encapsulated with the VLAN, and such message can not be forwarded through a network bridge in the standard Ethernet mechanism. However, such control message has to be forwarded transparently in order to provide the Ethernet dedicated line service in the telecommunication network.

Accordingly, problems occur in applying the existing basic Ethernet technical framework in the telecommunication operation network, particularly in the access and aggregation networks, and thus there is a need to improve the existing basic Ethernet technical framework.

SUMMARY OF THE INVENTION

According to an aspect of embodiments of the invention, an Ethernet switching and forwarding method is provided to address the problems of the MAC address spoofing, the DoS attack of MAC address capacity extendibility due to flooding-forwarding and auto-learning of the MAC address.

According to another aspect of the embodiments of the invention, an Ethernet switching and forwarding system and apparatus are provided.

The technical solutions according to the embodiments of the invention are as follows.

An Ethernet switching and forwarding method includes:
receiving, by an ingress port, an Ethernet message, allocating a VLAN tag with a uniform port to the message, determining a forwarding mode in accordance with the VLAN tag, and sending the message to a forwarding plane corresponding to the forwarding mode;

determining, by the forwarding plane, an egress port in accordance with the received message and the corresponding forwarding mode of the forwarding plane, and sending the message to the egress port in the forwarding mode; and encapsulating, by the egress port, the message by an attribute of the egress port, and then forwarding the message.

An Ethernet switching and forwarding system includes:
an ingress port adapted to receive an Ethernet message, allocate a VLAN tag with a uniform port to the message, determine a forwarding mode in accordance with the VLAN tag, and send the message to a forwarding plane corresponding to the forwarding mode;

the forwarding plane adapted to determine an egress port in accordance with the corresponding forwarding mode of the forwarding plane, and send the message to the egress port using the forwarding mode; and the egress port adapted to encapsulate the received message with an attribute of the egress port, and then forward the message.

An Ethernet switching and forwarding apparatus includes:
an ingress port adapted to receive an Ethernet message, allocate a VLAN tag with a uniform port to the message, determine a forwarding module in accordance with the VLAN tag, and send the message to a forwarding module corresponding to the forwarding mode;

the forwarding module adapted to determine an egress port in accordance with the corresponding forwarding mode of the forwarding module, and send the message to the egress port in the forwarding mode; and the egress port adapted to encapsulate the received message with an attribute of the egress port, and then forward the message.

With the above solutions of the Ethernet switching and forwarding method, system and apparatus according to the embodiments of the invention applied in a telecommunication network, in view of full compatibility with the traditional Ethernet technical framework, some specific demands in the telecommunication network may be satisfied. For example, flexible and abundant forwarding modes are provided for satisfying various telecommunication service demands, an extendable user and service identifier space are provided, the network security is ensured to eliminate potential risks of MAC address spoofing and DoS attack due to the flooding and auto-learning, connection based transparent transport is provided to support a TLS service and the like, and the problem of extendibility of a network MAC/VLAN space may be addressed.

DETAILED DESCRIPTION OF THE INVENTION

Figure 1:
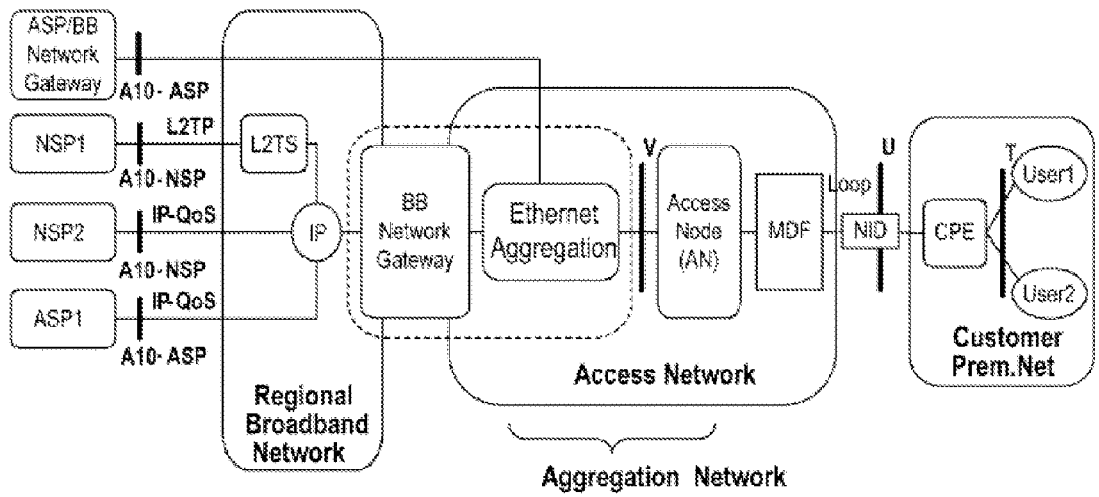
FIG. 1 is a diagram illustrating a DSL access and aggregation network system.

Embodiments of the invention are described in details as follows.

In view of demands in a telecommunication operation network, the existing Ethernet forwarding mode is improved with various definitions made based on the existing Ethernet network architecture according to an embodiment of the invention, and thus can be applied to an access device and an Ethernet aggregation device in telecommunication access and aggregation networks, and to an Ethernet forwarding and switching chip as well.

Accordingly, an Ethernet switching and forwarding method is provided according to an embodiment of the invention. The method includes the forwarding modes of standard Ethernet forwarding, multiplex Ethernet forwarding, layer-3 routing and forwarding, across-VLAN multicast forwarding, point-to-point VLAN forwarding, transparent point-to-point VLAN forwarding, point-to-point double VLAN forwarding, and transparent point-to-point double VLAN forwarding, which will be described in details below, respectively.

(1) Standard Ethernet forwarding: the standard Ethernet forwarding is based on flooding and MAC address auto-learning in a defined VLAN domain.

(2) Multiplex Ethernet forwarding: The multiplex Ethernet forwarding is applicable to a multiplex service model, in which a port is designated as a multiplex uplink port in a defined VLAN domain, traffic received at other ports is forwarded by default to the multiplex uplink port, and the traffic received at the multiplex uplink port is forwarded by flooding and MAC address lookup. A MAC forwarding table in the defined VLAN domain can be created through auto-learning or static configuration.

(3) Layer-3 routing and forwarding: The VLAN corresponds to a routing sub-network interface, and layer-2 termination and layer-3 routing and forwarding are implemented in the system.

(4) Across-VLAN multicast forwarding: A multicast message is inputted from a specific physical port and may carry a specific VLAN tag. However, the multicast forwarding will not be limited within the VLAN domain, and topology information used for multicast traffic forwarding via respective physical ports is obtained by Internet Group Management Protocol (IGMP) process of the physical ports to implement duplicating and forwarding between the physical ports across-VLAN domain.

(5) Point-to-point VLAN forwarding: A point-to-point relationship is established between physical ports and a corresponding specific VLAN is defined. In the VLAN domain, MAC address auto-learning is prohibited and message forwarding is determined directly from the correspondence relationship between the ports. In a forwarding process, a VLAN tag of a message can be switched as defined. A process of capturing a specific layer-2 control message, for example, Bridge Protocol Data Unit (BPDU), Dynamic Host Configuration Protocol (DHCP), IGMP, Internet Control Message Protocol (ICMP), etc. is supported in the VLAN domain.

(6) Transparent point-to-point VLAN forwarding: The transparent point-to-point VLAN forwarding is based on the point-to-point VLAN forwarding mode, but a message capturing process is prohibited and all messages are forwarded unconditionally.

(7) Point-to-point double VLAN forwarding: A point-to-point relationship is established between physical ports and a corresponding specific double VLAN is defined. In the double VLAN domain, MAC address auto-learning is prohibited and message forwarding is determined directly from the correspondence relationship between the ports. In a forwarding process, a double VLAN tag of a message can be switched as defined. A process of capturing a specific layer-2 control message, for example, BPDU, DHCP, Address Resolution Protocol (ARP), IGMP, ICMP, etc. is supported in the VLAN domain.

(8) Transparent point-to-point double VLAN forwarding: The transparent point-to-point double VLAN forwarding is based on the point-to-point double VLAN forwarding mode, but a message capturing process is prohibited and all messages are forwarded unconditionally.

Because different forwarding modes are required for different services and scopes of these forwarding modes function are separately defined based on a VLAN, the various forwarding modes can coexist in a system. Each VLAN corresponds to a forwarding mode which may be set by the VLAN itself. For example, a point-to-point VLAN forwarding originally set by a VLAN can be changed to an across-VLAN multicast forwarding.

Figure 2:
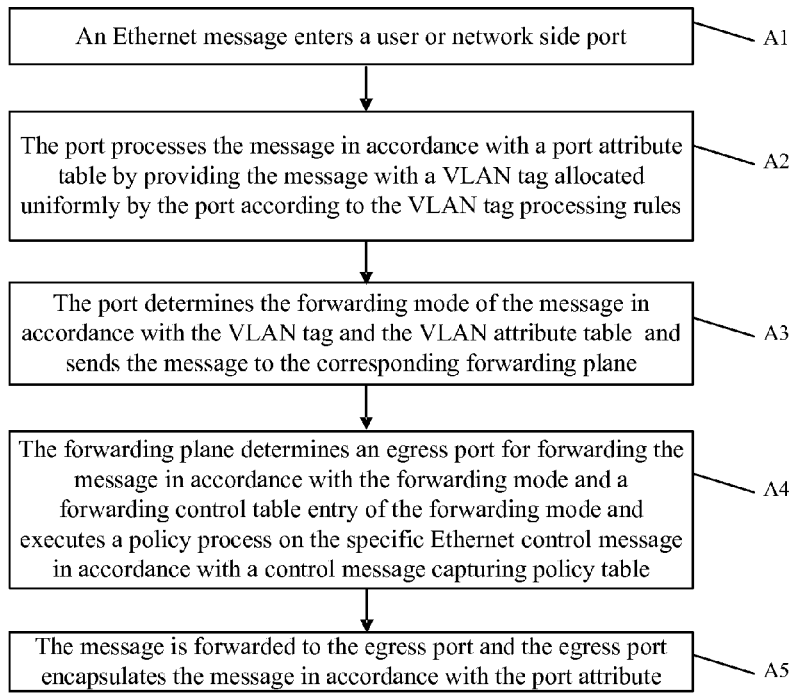
FIG. 2 is a flow chart of the method according to an embodiment of the invention.

A flow of the method according to an embodiment of the invention is illustrated in FIG. 2 and described in detail as follows.

A1. An Ethernet message enters a port which can be a user side port or a network side port. The port includes a port attribute table in which an entry of port type and an entry of VLAN tag processing rules including insertion, deletion, modification or replacement are set, and a VLAN attribute table in which Ethernet forwarding modes are set.

The port attribute table defines a port type including an access port, a hybrid port and a trunk port. In addition, the port attribute table defines the VLAN tag processing rules which may include operations of inserting, deleting, modifying, and replacing a VLAN tag. The VLAN tag processing rules are flexible and can be defined or revised as required in practice. The VLAN attribute table defines a VLAN attribute such as a default VLAN and a legal VLAN, and a forwarding plane to which the VLAN tag belongs. The port can determine whether to receive the message based on the VLAN attribute.

A2. A port processing entity processes the inputted message in accordance with the port attribute table to provide the message with the VLAN tag allocated uniformly by the port according to the VLAN tag processing rules, for example, by inserting the VLAN tag or deleting, modifying or replacing an original VLAN tag of the message. The process primarily relates to process on the VLAN tag of the message, so that the message is provided with the VLAN tag allocated uniformly by the port.

A3. The port determines the forwarding mode of the message and sends the message to the corresponding forwarding plane in accordance with the VLAN tag and the VLAN attribute table. The forwarding plane to which the VLAN tag belongs is defined in the VLAN attribute table of the user side port or network side port, so that the port may send the message to the appropriate forwarding plane for forwarding.

A4. An egress port of forwarding the message is determined in accordance with the forwarding mode and a forwarding control table entry of the forwarding mode in the forwarding plane, and a policy process is performed on the specific Ethernet message, in accordance with an Ethernet message capturing policy table. Specifically, after the message enters the relevant forwarding plane, an egress port for forwarding is determined in accordance with the forwarding mode and the forwarding control table entry in the forwarding plane, and the relevant policy process, for example, capturing, capturing and forwarding, transparent forwarding, discarding, etc. is performed on the specific Ethernet message, for example, the BPDU, DHCP, ARP, IGMP, ICMP, etc. in accordance with the Ethernet message capturing policy table. The Ethernet message to be captured can be defined flexibly as required.

A5. The Ethernet message is forwarded to the egress port, encapsulated according to a port attribute table corresponding to the port, and then forwarded from the egress port, thereby finishing the whole forwarding procedure.

In other words, after receiving the Ethernet message from the port and before sending the it to the egress port, the forwarding plane determines whether to capture the received Ethernet message in accordance with a message capturing policy, and if determining to capture the received Ethernet message, the forwarding plane processes the message in the message capturing policy; otherwise, the forwarding plane sends the message to the egress port in the forwarding mode. In other words, Step A5 is carried out. FIG. 2 illustrates only an example in which no capturing is required.

As described above, the forwarding plane in the above steps includes standard Ethernet forwarding, multiplex Ethernet forwarding, layer-3 routing and forwarding, across-VLAN multicast forwarding, point-to-point VLAN forwarding, and point-to-point double VLAN forwarding, and possibly transparent point-to-point VLAN forwarding and transparent point-to-point double VLAN forwarding.

The port receiving an Ethernet message in the above step A1 may be referred as to an ingress port, and the port sending the message in the Step A5 may be referred to as an egress port. Thus, the ingress port can be a user side port and the egress port can be a network side port; or the ingress port can be a network side port and the egress port can be a user side port.

In view of features of a telecommunication service, a traffic direction, an Ethernet message type, and a system port attribute are defined in an embodiment of the invention, which are described in details below.

In the Ethernet switching and forwarding method according to the embodiment of the invention, a traffic direction is defined as follows: service traffic may be in an upstream direction and a downstream direction, according to the features of a telecommunication service; the upstream direction means a direction from an end user to a network, i.e. from the Access Node to the Broadband Network Gateway, and the downstream direction means a direction from the network to the end user, i.e. from the Broadband Network Gateway to the Access Node. In other words, the message can be forwarded from a user side port to a network side network or from a network side port to a user side port.

In the Ethernet switching and forwarding method according to the embodiment of the invention, an Ethernet message type is defined as follows:

A message is encapsulated in an Ethernet message format fully compatible with IEEE definitions, and the supported message includes an untagged Ethernet message defined in the 802.1D, a VLAN-tagged Ethernet message defined in the 802.3Q, and a double VLAN-tagged message defined in the 802.3ad.

In the Ethernet switching and forwarding method according to the embodiment of the invention, a system port attribute is defined as follows:

An access port: This port is configured with a default VLAN attribute which may be a double VLAN-tagged attribute, and receives and sends only an untagged message, and the untagged message is forwarded, according to the VLAN with which the port is configured by default in the system.

A trunk port: The port receives and sends only a VLAN-tagged message which may be a double VLAN-tagged message.

A hybrid port: The port is configured with a default VLAN attribute which may be a double VLAN-tagged attribute, and may receive an untagged message and a VLAN-tagged message which may be a double VLAN-tagged message. The untagged message is forwarded, according to the VLAN with which the port is configured by default in the system. If the VLAN tag of the message is the same as the VLAN with which the port is configured by default, VLAN label encapsulation of the message is removed while the message is outputted.

Figure 3:
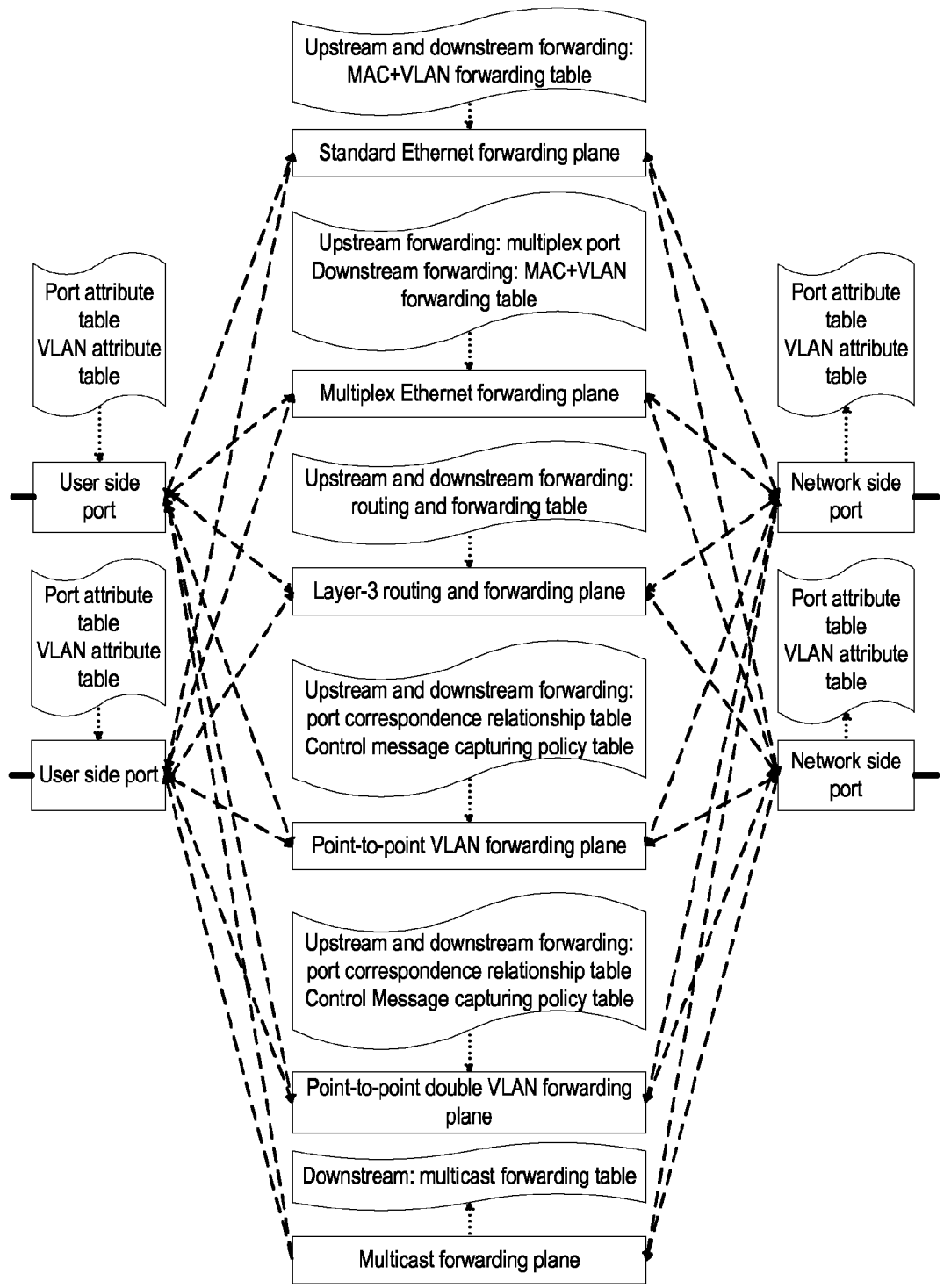
FIG. 3 is a schematic diagram of a logic structure of the system according to an embodiment of the invention.

The method according to a specific embodiment of the invention will be described below. As illustrated in FIG. 3, a schematic diagram of a logic implementation of the system is shown. In FIG. 3, there are arranged two user access ports and two network side ports, and a direction from the user port to the network port is referred to as an upstream direction and a direction from the network port to the user port is referred to as a downstream direction. There may be a plurality of or even a large number of user ports and network ports in a practical application, to which the method according to the present embodiment of the invention will still be applicable. The descriptions in the context of the invention may be merely illustrative of the scenario shown in FIG. 3, but the scenario of a plurality of or even a large number of user ports and network ports will readily occur to those skilled in the art.

There are two planes including a data processing plane and a control plane in the logic implementation of the system. Functions of the data processing plane are implemented by data processing entities including port processing entities and forwarding plane entities, which is described as follows.

The port processing entities include the user side port and the network side port.

The forwarding plane entities include a standard Ethernet forwarding plane, a multiplex Ethernet forwarding plane, a layer-3 routing and forwarding plane, a point-to-point VLAN forwarding plane, a point-to-point double VLAN forwarding plane, and a multicast forwarding plane, each of which corresponds a forwarding mode. For example, the standard Ethernet forwarding plane corresponds to the standard Ethernet forwarding mode.

Each of the data processing entities is provided with a relevant control table entry for the control plane. Correspondence relationships between the data processing entities and the control table entries are as illustrated in the table below.

TABLE 1

Correspondence relationship between data processing entities and control table entries

| Data processing plane | Control plane |
| --- | --- |
| User side port | Port attribute table<br>VLAN attribute table |
| Network side port | Port attribute table<br>VLAN attribute table |
| Standard Ethernet forwarding plane | Upstream and downstream forwarding: MAC + VLAN forwarding table |
| Multiplex Ethernet forwarding plane | Upstream forwarding: multiplex port<br>Downstream forwarding: MAC + VLAN forwarding table |
| Layer-3 routing and forwarding plane | Upstream and downstream forwarding: routing and forwarding table |
| Point-to-point VLAN forwarding plane | Upstream and downstream forwarding: port correspondence relationship table<br>Control message capturing policy table |
| Point-to-point double VLAN forwarding plane | Upstream and downstream forwarding: port correspondence relationship table<br>Control message capturing policy table |
| Multicast forwarding plane | Downstream: multicast forwarding table |

General forwarding procedures in the respective forwarding modes in FIG. 3 will be described in details below.

In the standard Ethernet forwarding mode:

B1. A message after process by an ingress port is provided with a VLAN tag allocated uniformly in the system. The VLAN tag points to the standard Ethernet forwarding plane.

B2. In the standard Ethernet forwarding plane, the Ethernet message is forwarded symmetrically in upstream and downstream directions, for each of which the forwarding control is implemented with a MAC+VLAN forwarding table entry to determine an egress port of the message.

B3. The Ethernet message is encapsulated according to a "port attribute" and a "VLAN attribute" at the egress port for the message, thereby finishing the forwarding procedure.

In the multiplex Ethernet forwarding mode:

C1. A message after process by an ingress port is provided with a VLAN tag allocated uniformly in the system. The VLAN tag points to the multiplex Ethernet forwarding plane.

C2. In the multiplex Ethernet forwarding plane, the Ethernet message is forwarded asymmetrically in upstream and downstream directions. In the upstream direction, the message is forwarded to a configured upstream port, with a MAC address and the VLAN tag being ignored. In the downstream direction, forwarding control of the message is implemented with a MAC+VLAN forwarding table entry to determine an egress of the message, as in the standard Ethernet forwarding mode.

C3. The Ethernet message is encapsulated according to a "port attribute" and a "VLAN attribute" at the egress port of the message, thereby finishing the forwarding procedure.

In the layer-3 routing and forwarding mode:

D1. A message after process by an ingress port is provided with a VLAN tag allocated uniformly in the system. The VLAN tag points to the layer-3 routing and forwarding plane and t is actually a routing interface.

D2. In the layer-3 routing and forwarding plane, link layer information of the Ethernet message is terminated, and the forwarding plane extracts information of destination IP address of the message and forwards the message based on a route forwarding table. This process is symmetrical in upstream and downstream directions.

D3. Egress encapsulation of the message is obtained from an adjacent information table for routing and forwarding, thereby finishing the forwarding procedure.

In the point-to-point VLAN forwarding mode:

E1. A message after process by an ingress port is provided with a VLAN tag allocated uniformly in the system. The VLAN tag points to the point-to-point VLAN forwarding plane.

E2. In the point-to-point VLAN forwarding plane, the Ethernet message is forwarded with information of its MAC address being ignored and an egress port for the message is determined from the correspondence relationship between the configured VLAN and the port. Additionally, to satisfy a specific demand of a dedicated line service, etc., a specific process of, for example, capturing, capturing and forwarding, transparent forwarding, discarding, etc. can be executed on a specific Ethernet control message as described above in the general flow. This process is defined in the "control message capturing policy table" which can be defined separately for each VLAN.

E3. The Ethernet message is encapsulated according to a "port attribute" and a "VLAN attribute" at the egress port of the message, thereby finishing the forwarding procedure.

The procedure in the point-to-point double VLAN forwarding mode is essentially the same as that in the point-to-point VLAN forwarding mode, except that the message forwarding port relationship is defined based on a double VLAN of the Ethernet message.

Unlike the above forwarding modes, the multicast forwarding mode is unidirectional, typically from the network side to the user side in a telecommunication network. After the message is determined as a multicast message at the ingress port based on a multicast MAC address, a multicast forwarding table, which may be a layer-2 multicast forwarding table or a layer-3 multicast forwarding table, is selected according to the VLAN tag to implement multicast duplicating and forwarding. At the egress port for the duplicated and forwarded multicast message, the Ethernet message can be encapsulated according to a port attribute and a VLAN attribute, thereby finishing the forwarding procedure.

With use of the method in the invention, an Ethernet switching and forwarding system is further provided according to an embodiment of the invention, and the system includes an ingress port, an egress port and forwarding planes including a standard Ethernet forwarding plane, a multiplex Ethernet forwarding plane, a layer-3 routing and forwarding plane, an across-VLAN multicast forwarding plane, a point-to-point VLAN forwarding plane, and a point-to-point double VLAN forwarding plane. The forwarding planes are arranged in parallel and implemented with corresponding forwarding modules, and the ingress port and the egress port are associated with the forwarding planes. The respective forwarding planes implement the different forwarding modes using the corresponding forwarding modules. The ingress port may be a user side port or a network side port, and the egress port is a network side port or a user side port.

The ingress port is adapted to receive an Ethernet message, allocate a VLAN tag which is uniform at the port to the message, determine a forwarding mode in accordance with the VLAN tag, and send the message to a forwarding plane corresponding to the forwarding mode; the forwarding plane determines an egress port according to its corresponding forwarding mode and sends the message to the egress port in the forwarding mode; and the egress port is adapted to encapsulate the received message using an attribute of the egress port and forward the message. Before sending the received message to the egress port, the forwarding plane is further adapted to process the received Ethernet message in a message capturing policy if determining to capture the message in accordance with the message capturing policy; and if determining not to capture the received Ethernet message, the forwarding plane sends the message to the egress port in the forwarding mode.

Specific process flows of the above entities are as described above and descriptions thereof will be omitted.

Furthermore, an Ethernet switching and forwarding apparatus is provided according to an embodiment of the invention, and the apparatus includes an ingress port, an egress port and at least one forwarding module. The forwarding module includes a standard Ethernet forwarding module, a multiplex Ethernet forwarding module, a layer-3 routing and forwarding module, an across-VLAN multicast forwarding module a point-to-point VLAN forwarding module, and a point-to-point double VLAN forwarding module. The forwarding modules are arranged in parallel, and the ingress port and the egress port are associated with the forwarding planes. The forwarding modules implement the respective forwarding modes. The ingress port may be a user side port or a network side port, and the egress port may be a network side part or a user side port.

The ingress port is adapted to receive an Ethernet message, allocate a VLAN tag which is uniform at the port to the message, determine a forwarding mode in accordance with the VLAN tag, and send the message to a forwarding module corresponding to the forwarding mode. The forwarding plane determines an egress port in accordance with its corresponding forwarding mode and sends the message to the egress port in the forwarding mode. The egress port is adapted to encapsulate the received message using an attribute of the egress port and forward the message. Before sending the received message to the egress port, the forwarding module is further adapted to process the received Ethernet message in a message capturing policy if determining to capture the message in accordance with the message capturing policy. If determining not to capture the received Ethernet message, the forwarding module sends the message to the egress port in the forwarding mode.

The above Ethernet switching and forwarding apparatus can be arranged in an access device, an Ethernet aggregation device, or an Ethernet switching and forwarding chip.

Specific process flows of the above entities are as described above and descriptions thereof will be omitted.

The basic principle and flow of the improved Ethernet forwarding approach according to the embodiments of the invention can be applicable in an access device of a telecommunication network, for example, an IP-Digital Subscriber Line Access Multiplexer (IP-DSLAM), or in an Ethernet forwarding chip used in a telecommunication application. A logic structure of the chip is as illustrated in FIG. 4.

Figure 4:
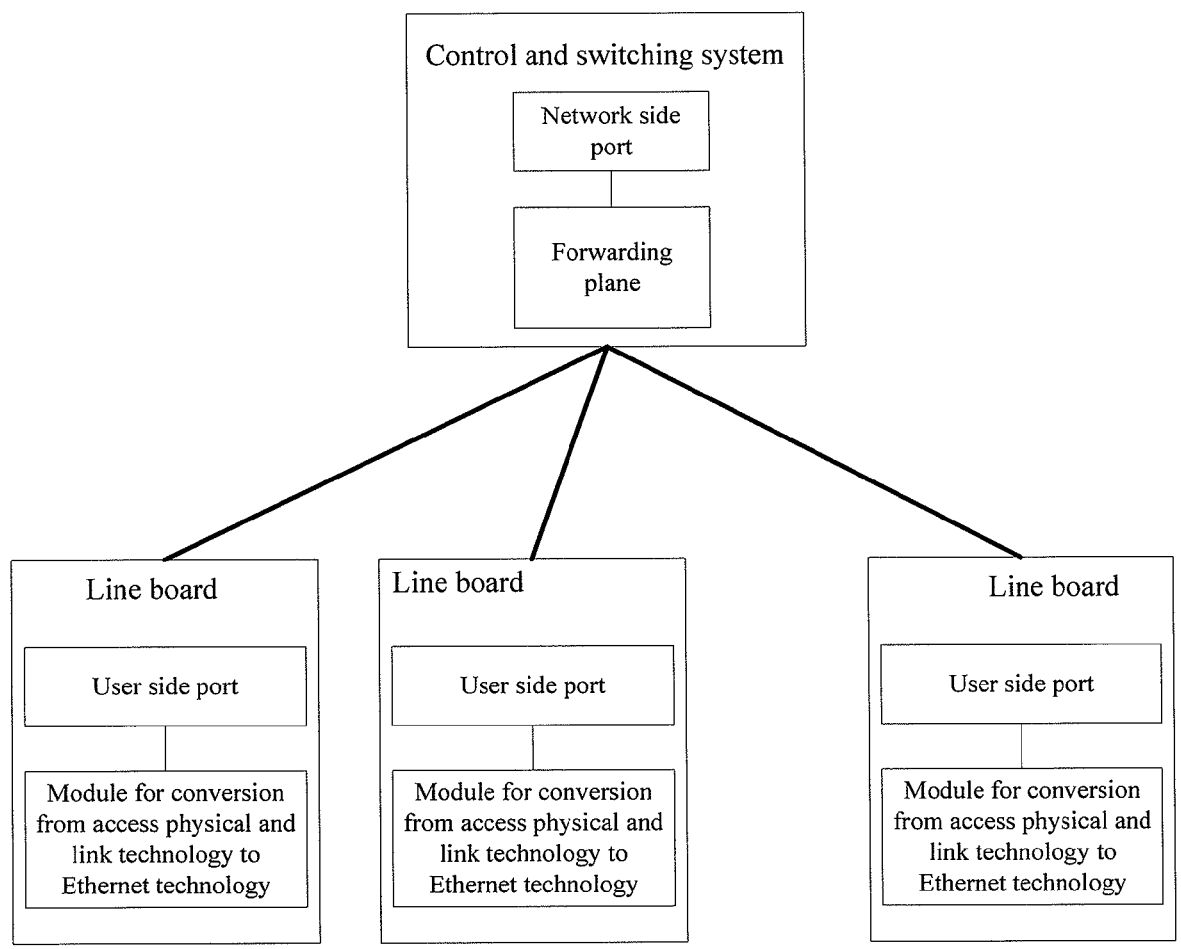
FIG. 4 is a schematic diagram of a structure of the apparatus according to an embodiment of the invention.

FIG. 4 is a block diagram of a typical IP-DSLAM, including "line boards" and a "control and forwarding" system. With reference to the improved Ethernet forwarding mode in FIG. 3, the function entity of the "user side port" can be implemented on the line board, and the entities of "forwarding planes" and the "network side ports" can be implemented on the "control and forwarding system." These logic entities may be function components internal to an Ethernet forwarding chip if the improved Ethernet forwarding approach according to the embodiment of the invention is applied in the chip.

The Ethernet switching and forwarding method, system and apparatus according to the embodiments of the invention can be applied in a telecommunication network to provide a user identifying technology applicable in the telecommunication network, with full compatibility with the existing Ethernet technical framework, so that the user can be identified with a VLAN (or double VLAN) tag, thereby eliminating incredibility of the user identified with a MAC address. MAC address learning can be prohibited, and the security issues due to user MAC spoofing are addressed according to the VLAN or double VLAN forwarding modes. An identifier suitable for a telecommunication service connection is provided, and the demand for isolation between services is satisfied by identifying a service connection with the VLAN or double VLAN tag. The extendibility of the number of MACs/VLANs in an aggregation network is improved by prohibiting MAC address learning and with the support from double VLAN. Capability of Transparent LAN service is provided by prohibiting MAC address learning and based on point-to-point transparent transport of VLAN and double VLAN.

Those ordinarily skilled in the art shall recognize that all or part of the steps in the method according to the embodiments of the invention can be implemented by a program instructing relevant hardware, and the program may be stored in a computer readable storage medium, for example, a ROM/RAM, a magnetic disk, an optical disk, etc.

It will be appreciated to those ordinarily skilled in the art that modifications and alternations to the embodiments of the invention can be made, and all these modifications and alternations are indented to be within the scope of the invention defined by the appended claims.

What is claimed is:

1. An Ethernet switching and forwarding method, comprising:

receiving, by an ingress port, an Ethernet message, allocating to the message a Virtual Local Area Network (VLAN) tag which is uniform at the ingress port in accordance with attribute of the ingress port;

determining a forwarding mode in accordance with the VLAN tag and a VLAN attribute table, wherein the VLAN attribute table defines a forwarding plane to which the VLAN tag belongs;

sending the message to one of forwarding planes corresponding to the forwarding mode, each of which forwarding planes corresponds to a forwarding mode;

determining, by the forwarding plane, an egress port in accordance with the received message and the forwarding mode, and sending the message to the egress port in the forwarding mode; and encapsulating, by the egress port, the message in accordance with an attribute of the egress port, and forwarding the message;

wherein the ingress port comprises a port attribute table in which table entries of port types and table entries of VLAN tag processing rules comprising insertion, deletion, modification or replacement are set, and the VLAN attribute table in which forwarding modes are set; and the ingress port allocates to the received message the VLAN tag, which is uniform at the ingress port and indicates the forwarding mode, by inserting, deleting, modifying, or replacing the VLAN tag, in accordance with the port attribute table and the VLAN attribute table.

2. The method according to claim 1, after the forwarding plane receives the Ethernet message and before the forwarding plane sends the received Ethernet message to the egress port, further comprising: determining, by the forwarding plane, whether to capture the received Ethernet message in accordance with a message capturing policy, and if determining to capture the message, executing a process on the message in the message capturing policy; otherwise, sending the message to the egress port in the forwarding mode; and the process in the message capturing policy comprises capturing, capturing and forwarding, transparent forwarding, or discarding.

3. The method according to claim 1, wherein:
the ingress port is a user side port and the egress port is a network side port; or
the ingress port is a network side port and the egress port is a user side port.

4. The method according to claim 1, wherein the forwarding plane comprises a standard Ethernet forwarding plane, a multiplex Ethernet forwarding plane, a layer-3 routing and forwarding plane, an across-Virtual Local Area Network multicast forwarding plane, a point-to-point Virtual Local Area Network forwarding plane, or a point-to-point double Virtual Local Area Network forwarding plane.

5. The method according to claim 4, wherein the forwarding plane further comprises a transparent point-to-point Virtual Local Area Network forwarding plane or a transparent point-to-point double Virtual Local Area Network forwarding plane.

6. The method according to claim 1, wherein the forwarding modes at the port attribute table are independent for each Virtual Local Area Network tag.

7. An Ethernet switching and forwarding system, comprising:
an ingress port configured to receive an Ethernet message, allocate to the message a Virtual Local Area Network (VLAN) tag which is uniform at the ingress port in accordance with attribute of the ingress port, determine a forwarding mode in accordance with the VLAN tag and a VLAN attribute table, wherein the VLAN attribute table defines a forwarding plane to which the VLAN tag belongs, and send the message to one of forwarding planes corresponding to the forwarding mode, each of which forwarding planes corresponds to a forwarding mode;
the forwarding plane configured to determine an egress port in accordance with the forwarding mode, and send the message to the egress port in the forwarding mode; and
the egress port configured to encapsulate the received message in accordance with an attribute of the egress port, and forward the message,
wherein the ingress port comprises a port attribute table in which table entries of port types and table entries of VLAN tag processing rules comprising insertion, deletion, modification or replacement are set, and the VLAN attribute table in which forwarding modes are set;
the ingress port allocates to the received message the VLAN tag, which is uniform at the ingress port and indicates the forwarding mode, by inserting, deleting, modifying, or replacing the VLAN tag, in accordance with the port attribute table and the VLAN attribute table.

8. The system according to claim 7, wherein the forwarding plane is further configured to, before sending the received message to the egress port, process the message in a message capturing policy if determining to capture the received Ethernet message in accordance with the message capturing policy, and send the message to the egress port in the forwarding mode if determining not to capture the received Ethernet message.

9. The system according to claim 7, wherein:
the ingress port is a user side port and the egress port is a network side port; or
the ingress port is a network side port and the egress port is a user side port.

10. The system according to claim 9, wherein the forwarding plane comprises a standard Ethernet forwarding plane, a multiplex Ethernet forwarding plane, a layer-3 routing and forwarding plane, an across-Virtual Local Area Network multicast forwarding plane, a point-to-point Virtual Local Area Network forwarding plane, a point-to-point double Virtual Local Area Network forwarding plane, a transparent point-to-point Virtual Local Area Network forwarding plane, or a transparent point-to-point double Virtual Local Area Network forwarding plane; and
the Ethernet switching and forwarding system comprises any one or combination of the planes.

11. An Ethernet switching and forwarding apparatus, comprising:
an ingress port configured to receive an Ethernet message, allocate to the message a Virtual Local Area Network (VLAN) tag which is uniform at the ingress port in accordance with attribute of the ingress port, determine a forwarding mode in accordance with the VLAN tag and a VLAN attribute table, wherein the VLAN attribute table defines a forwarding plane to which the VLAN tag belongs, and send the message to one of forwarding modules corresponding to the forwarding mode, each of which forwarding modules corresponds to a forwarding mode;
the forwarding module configured to determine an egress port in accordance with the forwarding mode, and send the message to the egress port in the forwarding mode; and
the egress port configured to encapsulate the received message in accordance with an attribute of the egress port, and forward the message,
wherein the ingress port comprises a port attribute table in which table entries of port types and table entries of VLAN tag processing rules comprising insertion, deletion, modification or replacement are set, and the VLAN attribute table in which forwarding modes are set;
the ingress port allocates to the received message the VLAN tag, which is uniform at the ingress port and indicates the forwarding mode, by inserting, deleting, modifying, or replacing the VLAN tag, in accordance with the port attribute table and the VLAN attribute table.

12. The apparatus according to claim 11, wherein the forwarding module is further configured to, before sending the received message to the egress port, process the message in a message capturing policy if determining to capture the received Ethernet message in accordance with the message capturing policy, and send the message to the egress port in the forwarding mode if determining not to capture the received Ethernet message.

13. The apparatus according to claim 11, wherein:
the ingress port is a user side port and the egress port is a network side port; or
the ingress port is a network side port and the egress port is a user side port.

14. The apparatus according to claim 11, wherein the forwarding module comprises a standard Ethernet forwarding module, a multiplex Ethernet forwarding module, a layer-3 routing and forwarding module, an across-Virtual Local Area Network multicast forwarding module, a point-to-point Virtual Local Area Network forwarding module, a point-to-point double Virtual Local Area Network forwarding module, a transparent point-to-point Virtual Local Area Network forwarding module, or a transparent point-to-point double Virtual Local Area Network forwarding module; and the Ethernet switching and forwarding apparatus comprises any one or combination of the modules.

15. The apparatus according to claim 11, wherein the Ethernet switching and forwarding apparatus is arranged in an access device, an Ethernet aggregation device, or an Ethernet switching and forwarding chip.

16. An Ethernet switching and forwarding method, comprising:

receiving, by an ingress port, an Ethernet message, allocating to the message a Virtual Local Area Network (VLAN) tag which is uniform at the ingress port in accordance with attribute of the ingress port;

determining a forwarding mode in accordance with the VLAN tag and a VLAN attribute table, wherein the VLAN attribute table defines a forwarding plane to which the VLAN tag belongs;

sending the message to one of forwarding planes corresponding to the forwarding mode, each of which forwarding planes corresponds to a forwarding mode;

determining, by the forwarding plane, an egress port in accordance with the received message and the forwarding mode, and sending the message to the egress port in the forwarding mode; and encapsulating, by the egress port, the message in accordance with an attribute of the egress port, and forwarding the message;

wherein the ingress port comprises a port attribute table in which table entries of port types are set, and the VLAN attribute table in which forwarding modes are set;

the ingress port allocates to the received message the VLAN tag in accordance with port attribute table and indicates the forwarding mode in accordance with the VLAN attribute table.

17. An Ethernet switching and forwarding apparatus, comprising:

an ingress port configured to receive an Ethernet message, allocate to the message a Virtual Local Area Network (VLAN) tag which is uniform at the ingress port in accordance with attribute of the ingress port, determine a forwarding mode in accordance with the VLAN tag and a VLAN attribute table, wherein the VLAN attribute table defines a forwarding plane to which the VLAN tag belongs, and send the message to one of forwarding modules corresponding to the forwarding mode, each of which forwarding planes corresponds to a forwarding mode;

the forwarding module configured to determine an egress port in accordance with the forwarding mode, and send the message to the egress port in the forwarding mode; and the egress port configured to encapsulate the received message in accordance with an attribute of the egress port, and forward the message, wherein the ingress port comprises a port attribute table in which table entries of port types are set, and the VLAN attribute table in which forwarding modes are set;

the ingress port allocates to the received message the VLAN tag in accordance with port attribute table and indicates the forwarding mode in accordance with and the VLAN attribute table.

* * * * *